United States Patent
Yokohama et al.

(10) Patent No.: US 9,388,348 B2
(45) Date of Patent: Jul. 12, 2016

(54) GASIFICATION APPARATUS

(71) Applicant: MITSUBISHI HEAVY INDUSTRIES, LTD., Tokyo (JP)

(72) Inventors: Katsuhiko Yokohama, Tokyo (JP); Osamu Shinada, Tokyo (JP); Masashi Kitada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/431,872

(22) PCT Filed: Oct. 9, 2013

(86) PCT No.: PCT/JP2013/077485
§ 371 (c)(1),
(2) Date: Mar. 27, 2015

(87) PCT Pub. No.: WO2014/061527
PCT Pub. Date: Apr. 24, 2014

(65) Prior Publication Data
US 2015/0240176 A1    Aug. 27, 2015

(30) Foreign Application Priority Data
Oct. 16, 2012 (JP) .................................. 2012-229153

(51) Int. Cl.
*C10L 3/10* (2006.01)
*C10J 3/76* (2006.01)
(Continued)

(52) U.S. Cl.
CPC .. *C10J 3/10* (2013.01); *C10J 3/485* (2013.01); *C10J 3/506* (2013.01); *C10J 3/76* (2013.01);
(Continued)

(58) Field of Classification Search
CPC ................ C10J 3/71; C10J 3/76; C10J 3/485; C10L 3/10
See application file for complete search history.

(56) References Cited

U.S. PATENT DOCUMENTS

| 5,441,547 A | * | 8/1995 | Durrfeld | .................... C10J 3/46 48/197 R |
| 5,445,658 A | * | 8/1995 | Durrfeld | .................. C10J 3/485 122/7 R |

(Continued)

FOREIGN PATENT DOCUMENTS

| CN | 201660608 | 12/2010 |
| JP | 61-246290 | 11/1986 |

(Continued)

OTHER PUBLICATIONS

Notice of Allowance issued Dec. 14, 2015 in corresponding Korean Patent Application No. 10-2015-7008189 (with partial English translation).

(Continued)

*Primary Examiner* — Matthew Merkling
(74) *Attorney, Agent, or Firm* — Wenderoth, Lind & Ponack, L.L.P.

(57) ABSTRACT

A gasification apparatus that is capable of appropriately controlling a differential pressure variation between the interior of a pressure vessel and the interior of a gasification furnace, and of simplifying a structure, by providing: a pressure vessel which forms a hollow shape; a gasification furnace which forms a hollow shape, and which is positioned inside the pressure vessel with a space section therebetween; a heat exchanger positioned at the upper section of the gasification furnace; a gas nozzle which supplies seal gas to the lower section of the space section; a char-receiving section provided above the heat exchanger in the space section; a pressure equalizer of which one end communicates with the interior of the gasification furnace, and the other end opens into the char-receiving section; and a gas flow channel which passes vertically through a side section of the char-receiving section.

10 Claims, 8 Drawing Sheets

(51) Int. Cl.
*F01K 23/10* (2006.01)
*C10J 3/84* (2006.01)
*C10J 3/10* (2006.01)
*C10J 3/48* (2006.01)
*C10J 3/50* (2006.01)
*F01K 23/06* (2006.01)

(52) U.S. Cl.
CPC ............... *F01K 23/067* (2013.01); *F01K 23/10* (2013.01); *C10J 3/84* (2013.01); *C10J 2200/152* (2013.01); *C10J 2200/156* (2013.01); *C10J 2300/093* (2013.01); *C10J 2300/0906* (2013.01); *C10J 2300/0956* (2013.01); *C10J 2300/0959* (2013.01); *C10J 2300/0976* (2013.01); *C10J 2300/1653* (2013.01); *C10J 2300/1678* (2013.01); *C10J 2300/1876* (2013.01); *Y02E 20/18* (2013.01)

(56) References Cited

U.S. PATENT DOCUMENTS 5,803,937 A * 9/1998 Hartermann ............. C10J 3/485 48/197 R
8,685,119 B2 * 4/2014 Van Den Berg ......... C10J 3/466 48/61
2008/0000155 A1 * 1/2008 Van Den Berg ........... C10J 3/56 48/208

FOREIGN PATENT DOCUMENTS

| JP | 8-302364 | 11/1996 |
| JP | 9-165584 | 6/1997 |
| JP | 2001-271073 | 10/2001 |
| JP | 2007-56207 | 3/2007 |
| JP | 4481906 | 6/2010 |
| JP | 2011-68812 | 4/2011 |
| KR | 2000-0015802 | 3/2000 |
| WO | 2013/118626 | 8/2013 |

OTHER PUBLICATIONS

International Search Report issued Dec. 10, 2013 in corresponding International Application No. PCT/JP2013/077485.

Concise explanation for Japanese Publication No. 61-246290, published Nov. 1, 1986.

Translation of Written Opinion of the International Searching Authority issued Dec. 10, 2013 in corresponding International Application No. PCT/JP2013/077485.

Office Action issued Mar. 14, 2016 in corresponding Chinese Patent Application No. 201380049405.8 (with English translation).

* cited by examiner

GASIFICATION APPARATUS

TECHNICAL FIELD

The present invention relates to a gasification apparatus which combusts and gasifies coal, a biomass, or the like to produce gas fuel.

BACKGROUND ART

For example, integrated coal gasification combined cycles are power generation facilities which gasify coal, and are combined with combined cycle power generation thereby aiming at increasing efficiency and environmental performance higher compared to related-art coal-fired power generation. The integrated coal gasification combined cycles have a great advantage that coal having a large amount of resources is also available. It is known that the advantage becomes greater by increasing applied kinds of coal.

Generally, the related-art integrated coal gasification combined cycles have a coal supply apparatus, a drying apparatus, a coal gasification apparatus, a gas purifying apparatus, a gas turbine facility, a steam turbine facility, a heat recovery steam generator, a gas cleaning apparatus, and the like. Accordingly, coal is pulverized after dried, and is supplied as pulverized coal to the coal gasification apparatus, air is taken in, the coal is combusted and gasified in this coal gasification apparatus, and produced gas (inflammable gas) is produced. Then, as this produced gas is supplied to the gas turbine facility after being purified, the produced gas is combusted to produce high-temperature high-pressure combustion gas to drive a turbine. The heat energy of the exhaust gas after driving the turbine is recovered by the heat recovery steam generator to produce steam, and the steam is supplied to the steam turbine facility to drive the turbine. Accordingly, power generation is performed. Meanwhile, the exhaust gas of which the heat energy is recovered is emitted to the atmospheric air via a chimney after harmful substances are removed by the gas cleaning apparatus.

In the coal gasification apparatus in the integrated coal gasification combined cycles, the gasification furnace is positioned inside the pressure vessel, a heat exchanger (gas cooler) is configured so as to be positioned on an upper side of the gasification furnace, and a space section between the pressure vessel and the gasification furnace is filled with seal gas. As such a coal gasification apparatus, there is, for example, one described in the following PTL 1. In the pressurization type gasification furnace described in this PTL 1, water-cooled walls are provided at a distance inside a pressure-resistance vessel, a space section between both of the walls and the interior of a furnace body are made to communicate with each other by piping, and a pressurizing and purifying gas is supplied to the space section according to the differential pressure between both the space section and the furnace body, thereby equalizing the pressure of the space section and the interior of the furnace body.

Additionally, as an apparatus obtained by simplifying such a coal gasification apparatus, there is, for example, one described in the following PTL 2. The gasification furnace apparatus described in this PTL 2 is obtained by providing a pressure vessel that houses a gasification furnace which gasifies fuel and a gas heat exchanger which performs the temperature control of the produced gas generated in the gasification furnace and steam generation using the sensible heat of the produced gas, and by connecting a pressure equalizer of which one end opens into the gasification furnace and the other end opens into the pressure vessel.

CITATION LIST

Patent Literature

[PTL 1] JP-A-61-246290
[PTL 2] JP-A-2011-068812

SUMMARY OF INVENTION

Technical Problem

However, in the pressurization type gasification furnace of PTL 1, piping which allows the space section and the interior of the furnace body to communicate with each other, a pressure gauge, pressurizing and purifying gas supply piping, opening and closing valves, and the like are required, and a structure becomes complicated. Meanwhile, if an attempt to apply the pressure equalizer in the gasification furnace device of PTL 2 to the pressurization type gasification furnace of PTL 1 is made, this pressure equalizer should extend to a lower side, which is not realistic.

The invention solves the above-described problem, and an object thereof is to provide a gasification apparatus that is capable of appropriately controlling a differential pressure variation between the interior of a pressure vessel and the interior of a gasification furnace, and of simplifying a structure.

Solution to Problem

The gasification apparatus of the invention for achieving the above object is a gasification apparatus which combusts and gasifies fuel to produce gas fuel. The gasification apparatus includes a pressure vessel which forms a hollow shape; a gasification furnace which forms a hollow shape and which is positioned inside the pressure vessel with a space section therebetween; a heat exchanger which is positioned at an upper section of the gasification furnace; a gas supply unit which supplies corrosion-resistant gas to a lower section of the space section; a char-receiving section which is provided above the heat exchanger in the space section; a pressure equalizer of which one end communicates with the gasification furnace and the other end opens into the char-receiving section; and a gas flow channel which passes vertically through a side section of the char-receiving section.

Accordingly, as the char-receiving section is provided on the upper side the space section between the pressure vessel and the gasification furnace and the pressure equalizer of which one end communicates with the gasification furnace and the other end opens into the char-receiving section are provided, the pressure equalizer can reduce the differential pressure between the interior of the gasification furnace and the interior of the pressure vessel (space section) and can appropriately catch the char in the fuel gas discharged to the space section due to a pressure increase inside the gasification furnace. As a result, the differential pressure variation between the interior of the pressure vessel and the interior of the gasification furnace can be appropriately controlled, and it is unnecessary to lengthen the pressure equalizer and thus a structure can be simplified.

In the gasification apparatus of the invention, the pressure equalizer is positioned at the space section, one end of the pressure equalizer opens into a furnace wall extending in the vertical direction in the gasification furnace, and the other end of the pressure equalizer has a wide angle and opens into a bottom surface of the char-receiving section.

Accordingly, as one end of the pressure equalizer opens into the furnace wall of the gasification furnace extending in the vertical direction, the pressure equalizer communicates with a region which has almost no flow velocity fluctuation of the ascending fuel gas. As a result, entering of the char into the pressure equalizer can be suppressed. Additionally, as the other end of the pressure equalizer has a wide angle and opens into a bottom surface of the char-receiving section, the char deposited on the char-receiving section due to a pressure decrease inside the gasification furnace can be appropriately sucked and returned to the gasification furnace.

In the gasification apparatus, the char-receiving section forms a recess shape and is positioned over the whole circumference or a portion of the space section, and a plurality of the pressure equalizers are provided at predetermined intervals in a circumferential direction of the space section.

Accordingly, as the char-receiving section forms a recess shape and is positioned over the whole circumference or a portion of the space section, while the plurality of pressure equalizers are provided at predetermined intervals in the circumferential direction, the differential pressure between the interior of the gasification furnace and the interior of the space section can be equalized by the pressure equalizer, and the char in the fuel gas discharged to the space section due to a pressure increase inside the gasification furnace can be reliably caught by the char-receiving section.

In the gasification apparatus of the invention, the gas flow channel is provided over the whole circumference or a portion of the space section.

Accordingly, as the gas flow path is provided over the whole circumference or a portion of the space section, the whole region of the space section between the pressure vessel and the gasification furnace can be appropriately filled with corrosive gas.

In the gasification apparatus of the invention, the gas flow channel is provided in a vertical direction along an outer wall of the gasification furnace.

Accordingly, since the gasification furnace is in a higher temperature state than the pressure vessel, the corrosive gas ascends along the outer wall of the gasification furnace. As a result, as the gas flow channel is provided along the outer wall of the gasification furnace, the whole region of the space section can be appropriately filled with the gas without disturbing the flow of this gas.

In the gasification apparatus of the invention, the gas flow channel is provided between an outer wall of the gasification furnace and an outer wall of the char-receiving section.

Accordingly, as the gas flow channel is constituted of the outer wall of the gasification furnace and the outer wall of the char-receiving section, it becomes unnecessary to provide a separate member and the simplification of the configuration and cost reduction can be made possible.

In the gasification apparatus of the invention, the char-receiving section has a bottom section which is provided below the pressure equalizer and into which the other end of the pressure equalizer opens, and an inclination section which inclines downward toward the bottom section.

Accordingly, as the char-receiving section is constituted of the bottom section into which the other end of the pressure equalizer opens and the inclination section around the bottom section, it becomes easy to bring the char deposited on the char-receiving section together at the bottom section, and at the time of a pressure decrease inside the gasification furnace, the char deposited on the char-receiving section can be efficiently sucked and returned to the gasification furnace.

In the gasification apparatus of the invention, the char-receiving section is positioned on a supporting member fixed to an inner wall of the pressure vessel with a seal member therebetween.

Accordingly, the mounting performance of the char-receiving section can be improved, and the flow of the gas can be blocked by the seal member to prevent diffusion of the char deposited on the char-receiving section.

In the gasification apparatus of the invention, a first char entering preventing member is provided on an upper side of the gas flow channel.

Accordingly, as the first char entering preventing member is provided on the upper side of the gas flow channel, when the flow rate of the gas in the gas flow channel decreases, the first char entering preventing member can prevent entering of the char into the gas flow channel and can prevent diffusion of the char to the space section.

In the gasification apparatus of the invention, the pressure equalizer provides a second char entering preventing member on a lower side of a communication section into the gasification furnace.

Accordingly, as the second char entering preventing member is provided on the lower side of the communication section into the gasification furnace in the pressure equalizer, when the char in the fuel ascends through the gasification furnace, the second char entering preventing member can prevent entering of the char into the pressure equalizer, and can prevent diffusion of the char to the space section.

Advantageous Effects of Invention

According to the gasification apparatus of the invention, since there are provided the char-receiving section provided above the heat exchanger in the space section between the pressure vessel and the gasification furnace, the pressure equalizer of which one end communicates with the gasification furnace and the other end opens into the char-receiving section, and the gas flow channel which passes vertically through the side section of the char-receiving section, the differential pressure variation between the interior of the pressure vessel and the interior of the gasification furnace can be appropriately controlled, and it becomes unnecessary to lengthen the pressure equalizer and thus a structure can be simplified.

DESCRIPTION OF EMBODIMENTS

Hereinafter, preferable examples of a gasification apparatus related to the invention will be described in detail with reference to the accompanying drawings. In addition, the invention is not limited by the examples and includes those configured by combining respective examples when there are a plurality of examples.

Example 1

Figure 1:
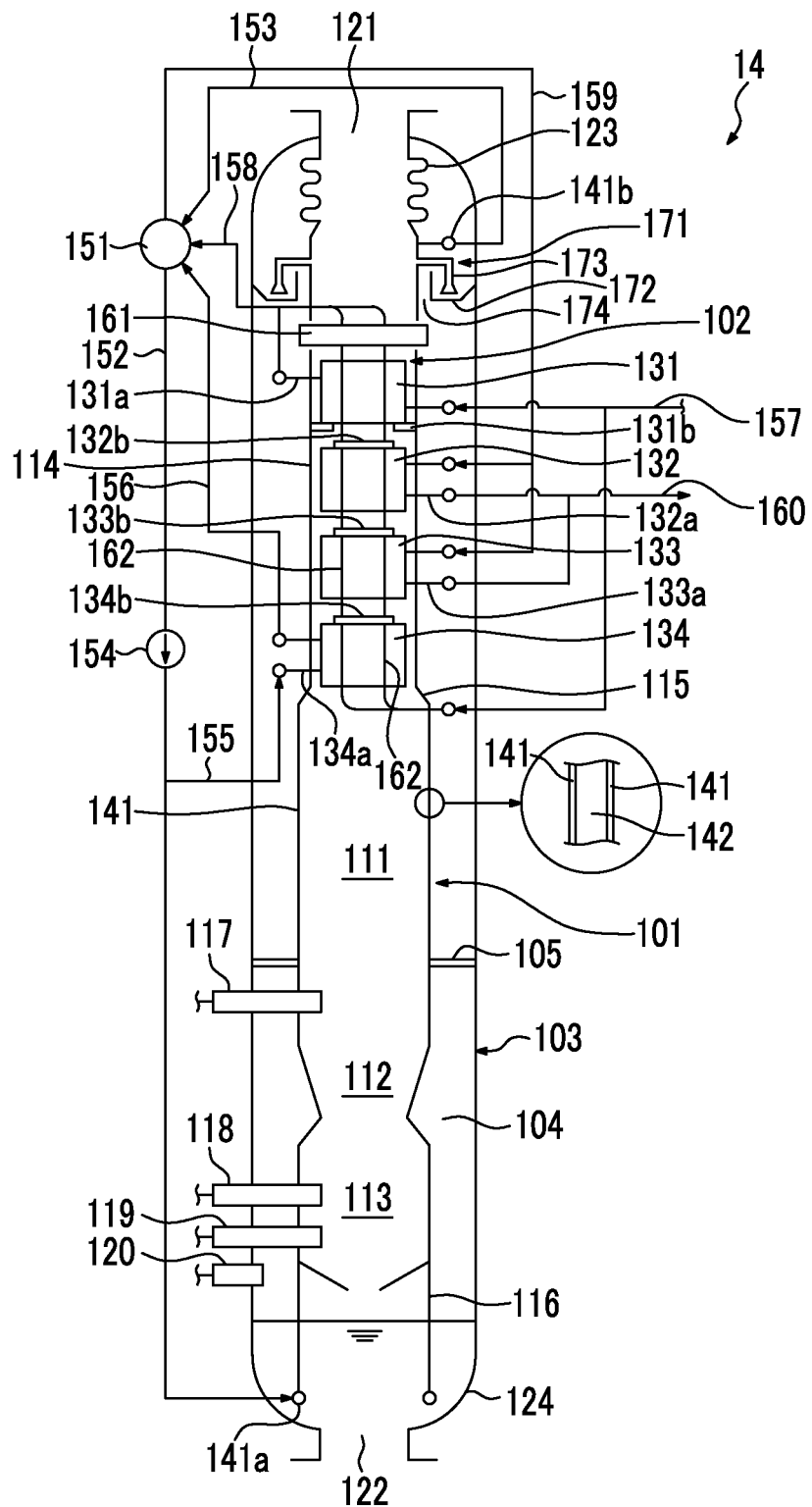
FIG. 1 is a schematic view illustrating a gasification apparatus related to Example 1 of the invention.
Figure 2:
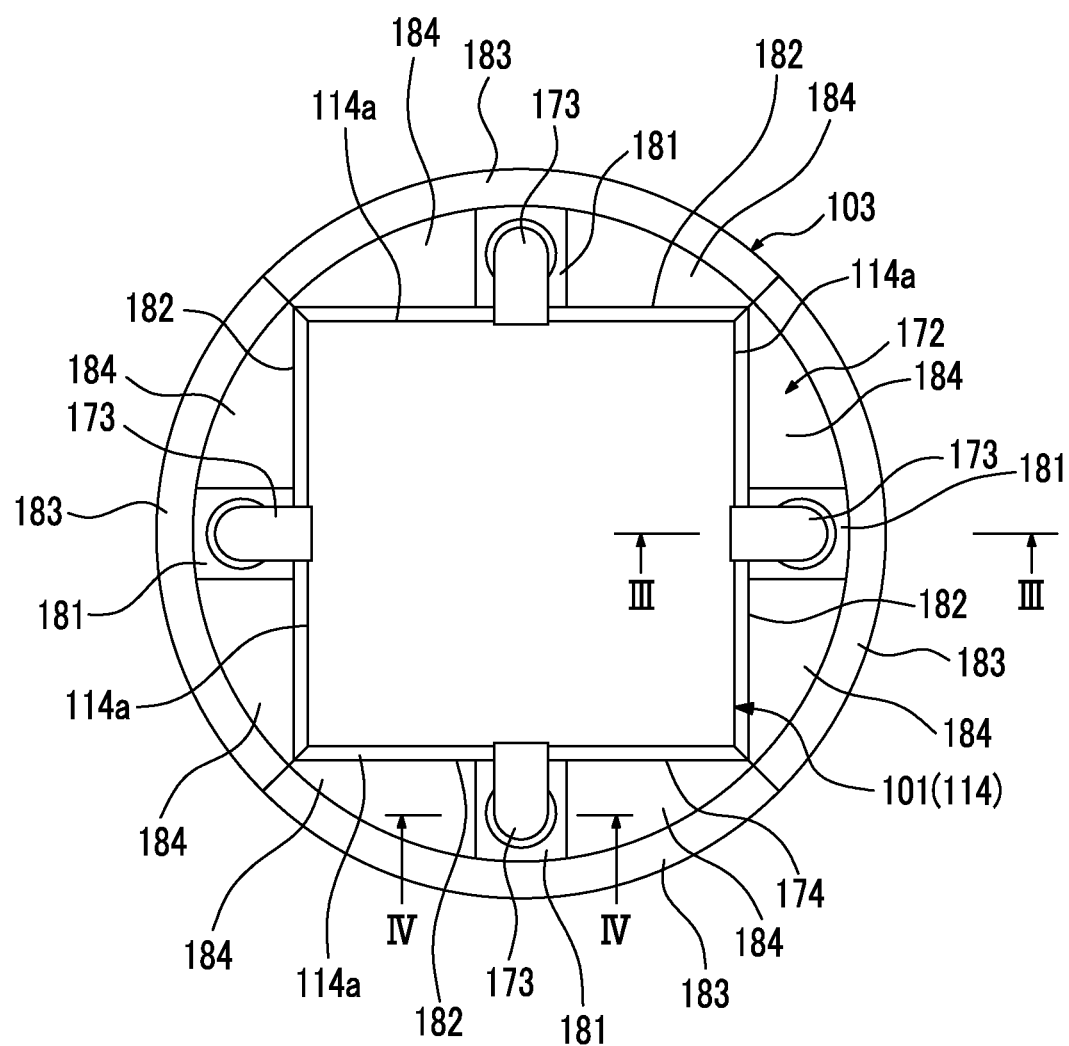
FIG. 2 is a schematic plan view illustrating a pressure equalizing device in the gasification apparatus of Example 1.
Figure 3:
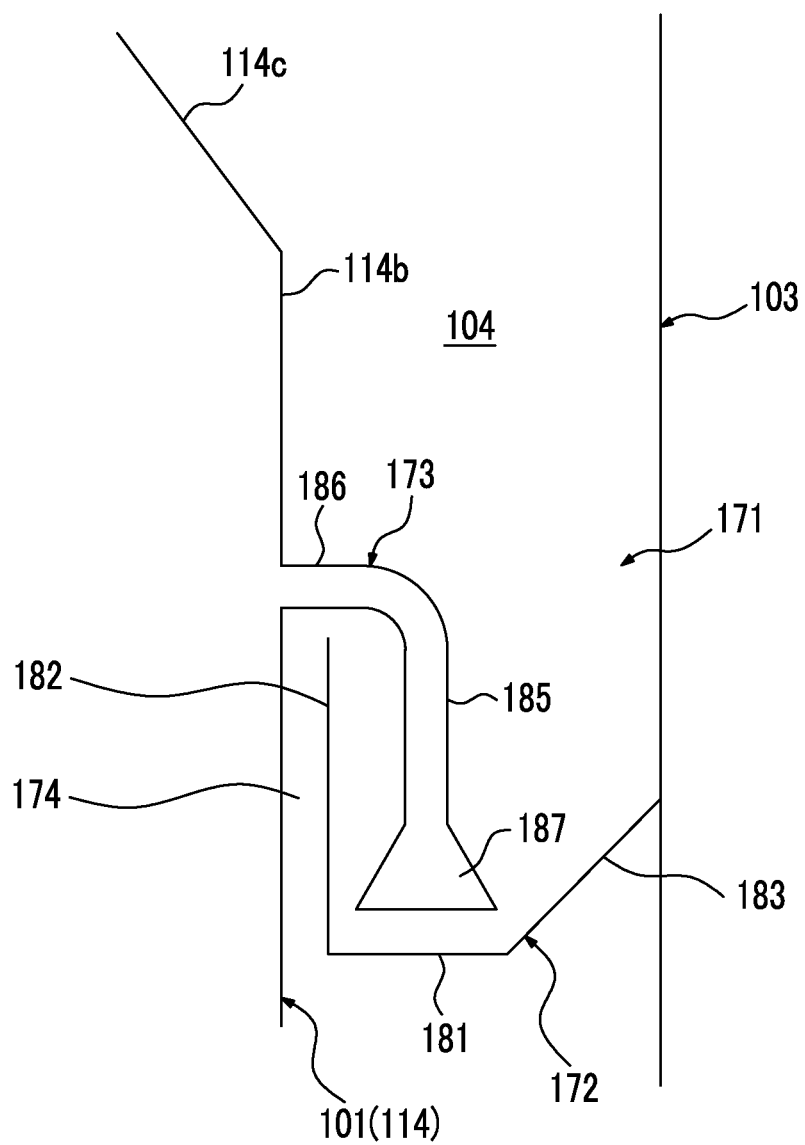
FIG. 3 is a cross-sectional view of FIG. 2 illustrating the pressure equalizing device of Example 1.
Figure 4:
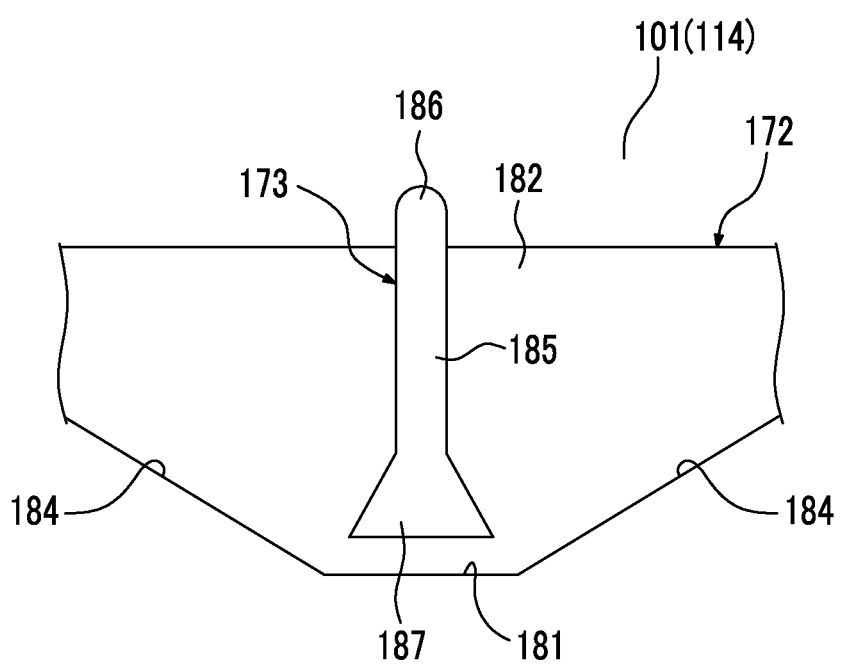
FIG. 4 is a IV-IV cross-sectional view of FIG. 2 illustrating the pressure equalizing device of Example 1.
Figure 5:
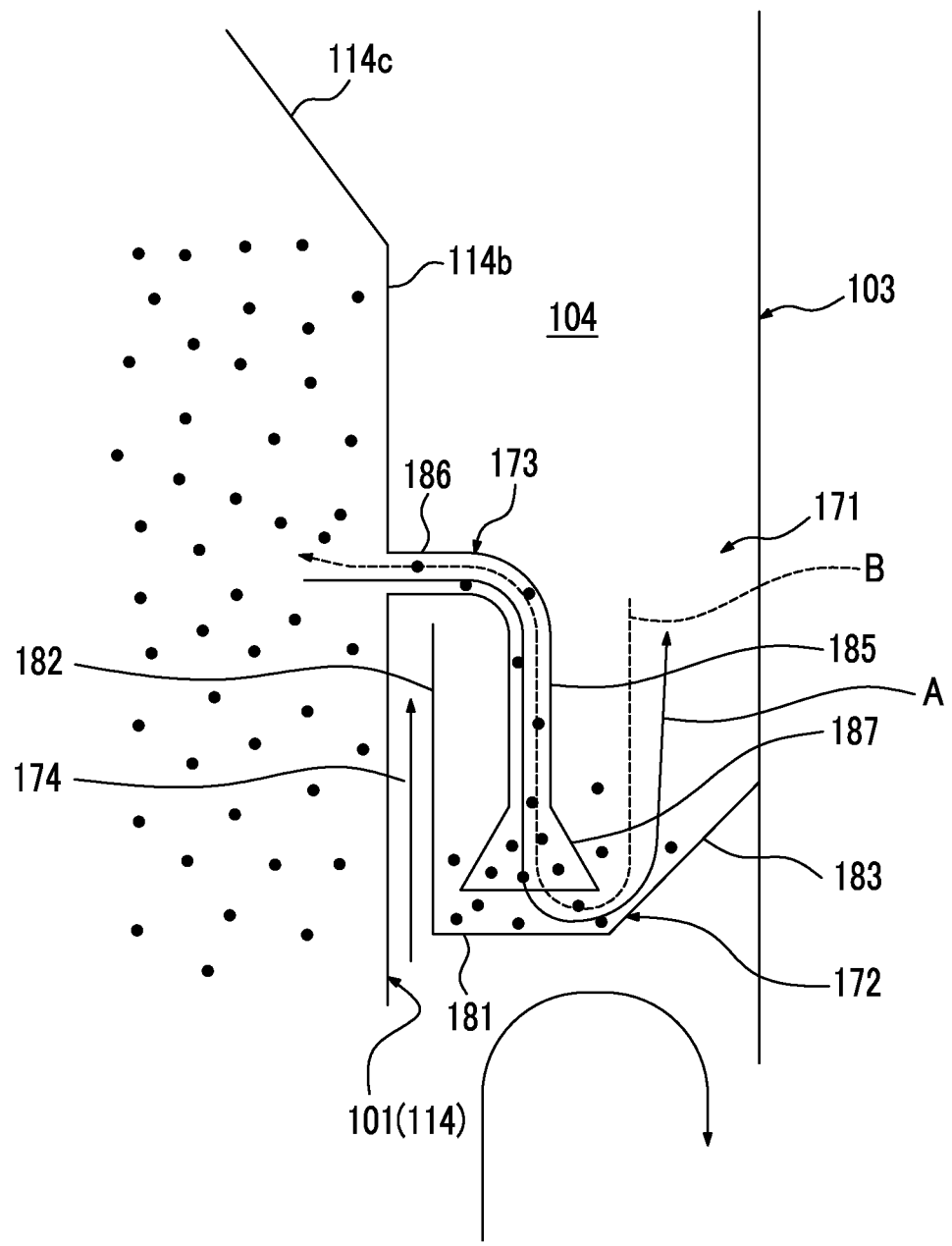
FIG. 5 is a schematic view illustrating the effects of the pressure equalizing device of Example 1.
Figure 6:
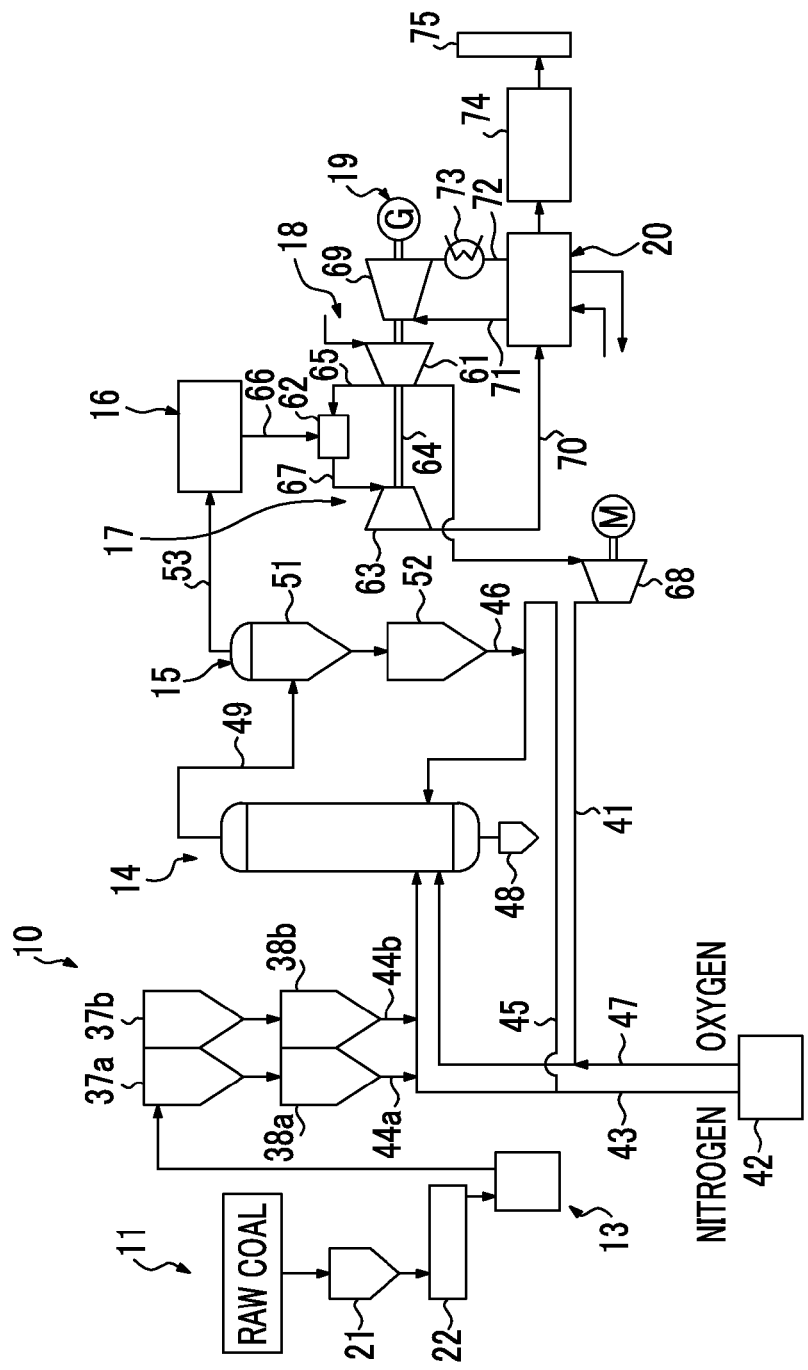
FIG. 6 is a schematic configuration diagram of an integrated coal gasification combined cycle to which the gasification apparatus of Example 1 is applied.

FIG. 1 is a schematic view illustrating a gasification apparatus related to Example 1 of the invention, FIG. 2 is a schematic plan view illustrating a pressure equalizing device in the gasification apparatus of Example 1, FIG. 3 is a cross-sectional view of FIG. 2 illustrating the pressure equalizing device of Example 1, FIG. 4 is a IV-IV cross-sectional view of FIG. 2 illustrating the pressure equalizing device of Example 1, FIG. 5 is a schematic view illustrating the effects of the pressure equalizing device of Example 1, and FIG. 6 is a schematic configuration diagram of an integrated coal gasification combined cycle to which the gasification apparatus of Example 1 is applied.

The integrated coal gasification combined cycle (IGCC) of Example 1 adopts an air combustion system which produces coal gas with the gasification apparatus, using air as an oxidizer, and supplies coal gas after the coal gas is purified in a gas purifying apparatus to a gas turbine facility as fuel gas, thereby performing electric power generation. That is, the integrated coal gasification combined cycle of Example 1 is an air combustion type (air blowing) power generation facility.

In Example 1, as illustrated in FIG. 6, the integrated coal gasification combined cycle 10 has a coal supply apparatus 11, a coal mill (mill) 13, a coal gasification apparatus 14, a char collection apparatus 15, a gas purifying apparatus 16, a gas turbine facility 17, a steam turbine facility 18, a generator 19, and a heat recovery steam generator (HRSG) 20.

The coal supply apparatus 11 has a raw coal bunker 21, a coal supply machine 22, and a crusher 23. The raw coal bunker 21 is capable of storing coal, and can drop a predetermined amount of coal into the coal supply machine 22. The coal supply machine 22 can convey the coal dropped from the raw coal bunker 21, using a conveyor or the like and can drop the coal to the coal mill (mill) 13.

The coal mill 13, which is a coal pulverizer, pulverizes raw coal into fine particles to produce pulverized coal. That is, the coal mill 13 makes raw coal (dried coal) into coal having a predetermined particle diameter or less, that is, pulverized coal. Then, the pulverized coal after pulverization by the coal mill 13 is separated from a carrying gas by pulverized coal bag filters 37a and 37b, and is stored in pulverized coal supply hoppers 38a and 38b.

The coal gasification apparatus 14 is adapted to enable the pulverized coal processed by the coal mill 13 to be supplied thereto and enable char (unburned portion of coal) collected by the char collection apparatus 15 to be returned and recycled thereto.

That is, the coal gasification apparatus 14 has a compressed air supply line 41 connected thereto from the gas turbine facility 17 (compressor 61), and is adapted to enable the compressed air compressed by the gas turbine facility 17 to be supplied thereto. An air separation apparatus 42 separates and produces nitrogen and oxygen from the atmospheric air, and has a first nitrogen supply line 43 connected to the coal gasification apparatus 14. Coal supply lines 44a and 44b from the pulverized coal supply hoppers 38a and 38b are connected to the first nitrogen supply line 43. Additionally, a second nitrogen supply line 45 is also connected to the coal gasification apparatus 14, and a char return line 46 from the char collection apparatus 15 is connected to the second nitrogen supply line 45. Moreover, an oxygen supply line 47 is connected to the compressed air supply line 41. In this case, nitrogen is used as a coal or char carrying gas, and oxygen is used as the oxidizer.

The coal gasification apparatus 14 has, for example, a two-stage two-chamber entrained bed type gasification furnace, and combusts and gasifies coal, char, air (oxygen), or steam as a gasifying agent which is supplied into the interior thereof, generates inflammable gas (produced gas or coal gas) having carbon dioxide as a main component, and causes a gasification reaction, using this inflammable gas as a gasifying agent. In addition, the coal gasification apparatus 14 is provided with a foreign matter removal apparatus 48 which removes foreign matter in which the pulverized coal is mixed. In this case, the coal gasification apparatus 14 may be a fluidized bed gasification furnace or a fixed bed gasification furnace without being limited to the entrained bed gasification furnace. Also, the coal gasification apparatus 14 is provided with a gas production line 49 of the inflammable gas toward the char collection apparatus 15, and is adapted to enable the inflammable gas including char to be discharged therefrom. In this case, as the gas production line 49 is provided with a gas cooler, the inflammable gas may be supplied to the char collection apparatus 15 after being cooled to a predetermined temperature.

The char collection apparatus 15 has a dust collector 51 and a supply hopper 52. In this case, the dust collector 51 is constituted of one or a plurality of bag filters or cyclones, and can separate the char contained in the inflammable gas generated by the coal gasification apparatus 14. Then, the inflammable gas from which the char is separated is delivered to the gas purifying apparatus 16 through a gas discharge line 53. The supply hopper 52 stores the char separated from the inflammable gas by the dust collector 51. In addition, a bottle may be positioned between the dust collector 51 and the supply hopper 52, and a plurality of the supply hoppers 52 may be connected to this bottle. Also, the char return line 46 from the supply hopper 52 is connected to the second nitrogen supply line 45.

The gas purifying apparatus 16 removes impurities, such as a sulfur compound or a nitrogen compound, from the inflammable gas from which the char is separated by the char collection apparatus 15, thereby performing gas purification. Also, the gas purifying apparatus 16 purifies the inflammable gas to produce fuel gas, and supplies this fuel gas to the gas turbine facility 17. In addition, in the gas purifying apparatus 16, a sulfur component ($H_2S$) is still included in the inflammable gas from which the char is separated. Therefore, the sulfur component is finally collected as plaster by being removed by an amine absorbent, and is effectively used.

The gas turbine facility 17 has the compressor 61, a combustor 62, and a turbine 63, and the compressor 61 and the turbine 63 are coupled by a rotating shaft 64. The combustor 62 has a compressed air supply line 65 connected thereto from the compressor 61, has a fuel gas supply line 66 connected thereto from the gas purifying apparatus 16, and has a combustion gas supply line 67 connected to the turbine 63. Additionally, the gas turbine facility 17 is provided with the compressed air supply line 41 which extends from the compressor 61 to the coal gasification apparatus 14, and a booster 68 is provided at a halfway portion of the compressed air supply line. Accordingly, the generator 19 can be driven by mixing and combusting the compressed air supplied from the compressor 61 and the fuel gas supplied from the gas purifying apparatus 16, in the combustor 62, and by rotating the rotating shaft 64 with the generated combustion gas, in the turbine 63.

The steam turbine facility 18 has a turbine 69 coupled to the rotating shaft 64 in the gas turbine facility 17, and the generator 19 is coupled to a base end portion of the rotating shaft 64. The heat recovery steam generator 20 is provided at an exhaust gas line 70 from the gas turbine facility 17 (turbine 63), and performs heat exchange between air and high-temperature exhaust gas, thereby producing steam. Therefore, a steam supply line 71 and a steam recovery line 72 are provided between the heat recovery steam generator 20 and the turbine 69 of the steam turbine facility 18, and a condenser 73 is provided at the steam recovery line 72. Accordingly, in the steam turbine facility 18, the turbine 69 can be driven with the steam supplied from the heat recovery steam generator 20, and the generator 19 can be driven by rotating the rotating shaft 64.

Also, harmful substance is removed by a gas cleaning apparatus 74 from the exhaust gas from which heat is recovered by the heat recovery steam generator 20, and the cleaned exhaust gas is emitted to the atmospheric air from a chimney 75.

Here, the operation of the integrated coal gasification combined cycle 10 of Example 1 will be described.

In the integrated coal gasification combined cycle 10 of Example 1, raw coal (coal) is stored in the raw coal bunker 21 in the coal supply apparatus 11, and the coal of the raw coal bunker 21 is charged into the coal mill 13 by the coal supply machine 22. In this coal mill, the coal is pulverized into fine particles, and pulverized coal is produced and is stored in the pulverized coal supply hoppers 38a and 38b via the pulverized coal bag filters 37a and 37b. The pulverized coal stored in the pulverized coal supply hoppers 38a and 38b is supplied to the coal gasification apparatus 14 through the first nitrogen supply line 43 by the nitrogen supplied from the air separation apparatus 42. Additionally, the char collected by the char collection apparatus 15 to be described below is supplied to the coal gasification apparatus 14 through the second nitrogen supply line 45 by the nitrogen supplied from the air separation apparatus 42. Moreover, after the compressed air leaked from the gas turbine facility 17 to be described below is raised in pressure by the booster 68, the compressed air is supplied to the coal gasification apparatus 14 through the compressed air supply line 41 together with the oxygen supplied from the air separation apparatus 42.

In the coal gasification apparatus 14, the pulverized coal and the supplied char can be combusted by the compressed air (oxygen) and the pulverized coal and the char can be gasified to produce inflammable gas (coal gas) having carbon dioxide as a main component. Then, this inflammable gas is discharged through the gas production line 49 from the coal gasification apparatus 14, and is delivered to the char collection apparatus 15.

In the char collection apparatus 15, the inflammable gas is first supplied to the dust collector 51 where the char contained in this gas is separated from the inflammable gas. Then, the inflammable gas from which the char is separated is delivered to the gas purifying apparatus 16 through the gas discharge line 53. Meanwhile, the particle char separated from the inflammable gas is deposited on the supply hopper 52, and is returned and recycled to the coal gasification apparatus 14 through the char return line 46.

The inflammable gas is purified by impurities, such as a sulfur compound or a nitrogen compound, being removed in the gas purifying apparatus 16 from the inflammable gas from which the char is separated by the char collection apparatus 15, and fuel gas is produced. Then, in the gas turbine facility 17, if the compressor 61 produces compressed air to supply the compressed air to combustor 62, the combustor 62 mixes and combusts the compressed air supplied from the compressor 61 and the fuel gas supplied from the gas purifying apparatus 16, thereby producing combustion gas. The turbine 63 can be driven with this combustion gas to drive the generator 19 via the rotating shaft 64 to perform power generation.

Then, the exhaust gas discharged from the turbine 63 in the gas turbine facility 17 performs heat exchange with air in the heat recovery steam generator 20 to produce steam, and this produced steam is supplied to the steam turbine facility 18. In the steam turbine facility 18, the generator 19 can be driven via the rotating shaft 64 to perform power generation by driving the turbine 69 with the steam supplied from the heat recovery steam generator 20.

Thereafter, in the gas cleaning apparatus 74, the harmful substance of the exhaust gas discharged from the heat recovery steam generator 20 is removed, and the cleansed exhaust gas is emitted to the atmospheric air from the chimney 75.

Hereinafter, the coal gasification apparatus 14 in the above-described integrated coal gasification combined cycle 10 will be described in detail.

The coal gasification apparatus 14, as illustrated in FIG. 1, has a gasification furnace 101 having a hollow cross-sectional shape, a heat exchanger 102 which is positioned on the upper side of the gasification furnace 101, and a pressure vessel 103 which houses the gasification furnace 101, and a space section 104 is partitioned between the gasification furnace 101 and the pressure vessel 103.

The gasification furnace 101 forms a hollow shape, and is constituted of a reductor section 111, a diffuser section 112, and a combustor section 113 from above.

The pressure vessel 103 forms a hollow cylindrical shape, has a gas exhaust port 121 formed at an upper end thereof, and has a slag discharge port 122 formed at a lower end thereof. The pressure vessel 103 has the gasification furnace 101 positioned therein. Namely, in the gasification furnace 101, the pressure vessel 103 is positioned outside the gasification furnace with a predetermined space section 104 therebetween, and an outer surface of the reductor section 111 in the gasification furnace 101 is supported on an inner surface of the pressure vessel 103 by a supporting section 105.

Also, a heat exchanger housing section 114 has an upper end coupled to an upper end of the pressure vessel 103 by an expansion joint 123, and communicates with the gas exhaust port 121. The pressure vessel 103 has a slag hopper 124 provided at a lower section thereof, and a lower end of the gasification furnace 101, that is, an overhanging portion 116, which is hung from the combustor section 113 and forms a ring shape, is submerged in the reservoir water of the slag hopper 124 and is water-sealed.

Additionally, in the gasification furnace 101, a plurality of combustion apparatuses including a plurality of burners 117 which are positioned at equal intervals in a circumferential direction in the reductor section 111 are positioned, and two sets of combustion apparatuses including a plurality of burners 118 and 119 which are positioned at equal intervals in the combustor section 113 are positioned. The respective burners 117, 118, and 119 are fixed so as to pass through the pressure vessel 103 and the gasification furnace 101 from the outside and be substantially horizontal. Also, the supporting section 105 of the gasification furnace 101 is located on the upper side of the burner 117. In this case, the supporting section 105 may be provided at the diffuser section 112 or the combustor section 113 without being limited to this position. That is, it is preferable that the supporting section be located near each of the burners 117, 118, and 119.

In addition, as illustrated in FIG. 6, a line where the first nitrogen supply line 43 and the first coal supply lines 44a and 44*b* are assembled is connected to the burner 117, the char return line 46 is connected to the burner 118, and a line where the oxygen supply line 47 and the compressed air supply line 41 are assembled is connected to the burner 119.

Additionally, the pressure vessel 103 is provided with a gas nozzle (gas supply unit) 120 which supplies seal gas (for example, nitrogen gas, carbon dioxide gas, natural gas, or the like) as corrosion-resistant gas to the space section 104 formed between the pressure vessel 103 and gasification furnace 101. The gas nozzle 120 is provided at a lower section of the pressure vessel 103, specifically, below the burner 119, and can supply the seal gas to a lower section of the space section 104, thereby causing the seal gas to ascend inside the space section 104 to fill the whole region of the space section.

Meanwhile, in the heat exchanger 102, a fuel economizer (economizer) 131, superheaters 132 and 133, and an evaporator 134 are positioned at predetermined intervals downward from above as a plurality of heat exchange units in an up-down direction.

In the gasification furnace 101, a furnace wall extends in the vertical direction and is constituted of a plurality of heat transfer tubes 141 which are provided side by side in the circumferential direction.

Specifically, in the furnace wall, the heat transfer tubes 141 and fins 142 are alternately coupled by welding. It is preferable that the heat transfer tubes 141 and the fins 142 be made of stainless steel.

Also, in the gasification furnace 101, the furnace wall is constituted of the same number of the heat transfer tubes 141 which extend in the vertical direction. Namely, the respective heat transfer tubes 141 extend in the vertical direction over the whole region of the gasification furnace 101, and the furnace wall of the gasification furnace 101 is formed by the same heat transfer tubes 141 extending vertically and being provided side by side in the circumferential direction without some heat transfer tubes 141 being cut and separate heat transfer tubes being increased.

Also, lower ends of the plurality of heat transfer tubes 141 are brought together at a header 141*a*, and upper ends thereof are brought together at a header 141*b*. A steam drum 151 is coupled to the header 141*a* via a descending pipe 152 and is coupled to the header 141*b* via an ascending pipe 153, and the descending pipe 152 is provided with a circulating pump 154. Additionally, the descending pipe 152 is provided with a branch pipe 155, the branch pipe 155 is coupled to one end (inlet header) of a heat transfer tube 134*a* of the evaporator 134, and a delivery pipe 156 coupled to the other end (outlet header) of the heat transfer tube 134*a* is coupled to the steam drum 151.

A water supply pipe 157 from the outside is coupled to one end (inlet header) of a heat transfer tube 131*a* of the fuel economizer 131, and a water delivery pipe 158 coupled to the other end (outlet header) of the heat transfer tube 131*a* is coupled to the steam drum 151. Additionally, a steam pipe 159 from the steam drum 151 is branched and is coupled to one ends (inlet header) of heat transfer tubes 132*a* and 133*a* of the superheaters 132 and 133, and a steam discharge line 160 coupled to the other ends (outlet header) of the heat transfer tubes 132*a* and 133*a* is coupled to a steam turbine which is not illustrated.

In the heat exchanger 102, a beam member 161 is positioned above the fuel economizer 131, and the beam member 161 has ends coupled to the furnace wall (the heat transfer tubes 141 and the fins 142) by welding. Additionally, in the heat exchanger 102, a plurality of cooling pipes 162 as hanging tools are positioned in the up-down direction, and are coupled to the water delivery pipe 158 after a lower end thereof is coupled to the water supply pipe 157 and an upper end thereof is supported on the beam member 161. Also, the two superheaters 132 and 133 and the evaporator 134 are hung from and supported by the plurality of cooling pipes 162 via hanging metal hooks 132*b*, 133*b*, and 134*b*. Additionally, the fuel economizer 131 is placed and supported on a supporting plate 131*b* fixed to the furnace wall (the heat transfer tube 141 and the fins 142) by welding.

That is, since the heat exchanger 102 having a higher temperature as the lower section thereof is nearer to the gasification furnace 101, the heat exchanger has weak durability of welding. Therefore, the two superheaters 132 and 133 and the evaporator 134 which are located on the lower side are hung from the upper beam member 161 via the plurality of cooling pipes 162, and the fuel economizer 131 which is located on the upper side is placed on the supporting plate 131*b* welded to the furnace wall. In this case, according to the temperature conditions of the heat exchanger 102, the two superheaters 132 and 133 may also be placed and supported by welding the supporting plate to the furnace wall.

Meanwhile, in the coal gasification apparatus 14 of Example 1, a pressure equalizing device 171 as a sedimentation type classifying mechanism is provided at an upper section of the space section 104, that is, between the gasification furnace 101 (heat exchanger housing section 114) and the pressure vessel 103. The pressure equalizing device 171 has a char-receiving section 172 which is provided above the heat exchanger 102 in the space section 104, a pressure equalizer 173 of which one end communicates with the interior of the gasification furnace 101 and the other end opens into the char-receiving section 172, and a gas flow channel 174 which passes vertically through a side section of the char-receiving section 172.

In the pressure equalizing device 171, as illustrated in FIGS. 2 to 4, the char-receiving section 172 forms a recess shape, and is positioned over the whole circumference (a portion) of the space section 104, and is divided into four pieces in conformity with a quadrangular cross-sectional shape of the heat exchanger housing section 114 in the gasification furnace 101, and the respective pieces have substantially the same configuration. A plurality of the (four in the present example) pressure equalizers 173 are provided at predetermined intervals (equal intervals) in the circumferential direction in the space section 104. The char-receiving section 172 is positioned so as to block an inner wall surface of the pressure vessel 103 in the space section 104 and an outer surface of a furnace wall 114*a* of the heat exchanger housing section 114 in the gasification furnace 101, and is provided so as to face the lower side of each pressure equalizer 173.

Namely, the char-receiving section 172 is constituted of a horizontal bottom section 181 into which the other end of each pressure equalizer 173 opens, a vertical wall section 182 which rises in the vertical direction from the end of the bottom section 181 on the gasification furnace 101 (heat exchanger housing section 114) side, a first inclination section 183 which rises obliquely upward from the end of the bottom section 181 on the pressure vessel 103 side, and two second inclination sections 184 which rise obliquely upward in the circumferential direction of the space section 104 in the bottom section 181. Therefore, in the char-receiving section 172, since the three inclination sections 183 and 184 incline downward toward the bottom section 181, the char caught by the char-receiving section 172 can be brought together in the bottom section 181 due to gravity. In addition, the inclination sections 183 and 184 may not linearly incline but curvedly incline, or may be in a stream surface shape obtained by combining the inclination sections 183 and 184.

The respective pressure equalizers 173 have substantially the same configuration and are positioned in the space section 104. Also, each pressure equalizer 173 is constituted of a straight section 185 which extends in the vertical direction, a curved section 186 which is provided continuously with an upper end of the straight section 185 and is fixed in communication with the furnace wall 114a of the heat exchanger housing section 114 in the gasification furnace 101, and a wide angle section 187 which is provided continuously with a lower end of the straight section 185 and opens downward at a wide angle. In this case, the heat exchanger housing section 114 has a diameter-reduced section 114c where an upper section thereof becomes gradually smaller from an equal-diameter section 114b extending in the vertical direction, and is coupled to the upper end of the pressure vessel 103 via the expansion joint 123, and the furnace wall of the equal-diameter section 114b of the heat exchanger housing section 114 opens into the curved section 186. Meanwhile, the wide angle section 187 opens to an upper surface (bottom surface) of the bottom section 181 of the char-receiving section 172 with a predetermined gap. In addition, it is desirable to set the gap between an opening surface of the wide angle section 187 and the upper surface (bottom surface) of the bottom section 181 of the char-receiving section 172 to a value equal to or less than two times the opening width (internal diameter) of the wide angle section 187.

Additionally, the gas flow channel 174 is provided over the whole circumference (or a portion) of the space section 104. Specifically, the gas flow channel 174 is provided between an outer wall of the gasification furnace 101 (heat exchanger housing section 114) and an outer wall of the char-receiving section 172, that is, the vertical wall section 182, and is provided in the vertical direction along the outer wall of the gasification furnace 101 (heat exchanger housing section 114). A lower section of the gas flow channel 174 opens below the bottom section 181 in the char-receiving section 172, and an upper section thereof opens toward the curved section 186 of the pressure equalizer 173.

In addition, although the char-receiving section 172 is formed into the recess shape, the volume thereof is set to be greater than the volume of inflow particles which is calculated from the product of ½ of the amount of pulverized coal charged into the coal gasification apparatus 14, dust concentration calculated from the amount of produced fuel gas, and the amount of gas which flows into the gap from the gasification furnace 101 at the time of the pressure increase of the gasification furnace 101.

Here, the operation of the coal gasification apparatus 14 of above-described Example 1 will be described.

In the coal gasification apparatus 14, as illustrated in FIG. 1, nitrogen and pulverized coal are charged in the gasification furnace 101 and ignited by the burner 117, and char and compressed air (oxygen) are charged and ignited by the burners 118 and 119. Then, in the combustor section 113, high-temperature combustion gas is generated by the combustion of the pulverized coal and the char. Additionally, in the combustor section 113, liquid slag is produced in the high-temperature gas by the combustion of the pulverized coal and the char, and this liquid slag adheres to the furnace wall, falls to the furnace bottom, and is finally discharged to the water reservoir inside the slag hopper 124. Then, the high-temperature combustion gas produced in the combustor section 113 rises to the reductor section 111 through the diffuser section 112. In the reductor section 111, the pulverized coal is mixed with the high-temperature combustion gas, a gasification reaction is performed in a high-temperature reducing atmosphere place, and inflammable gas (coal gas) having carbon dioxide as a main component is produced.

At this time, water supplying is performed from the water supply pipe 157 to the fuel economizer 131, and supply water is heated in the fuel economizer and is delivered to the steam drum 151 through the water delivery pipe 158. The steam drum 151 delivers the supply water to lower sections of the plurality of heat transfer tubes 141 as the furnace wall through the descending pipe 152 with the circulating pump 154, and delivers the supply water to the evaporator 134 through the branch pipe 155. Then, when the supply water ascends in the plurality of heat transfer tubes 141, the gasification furnace 101 is cooled, and the supply water is delivered to the steam drum 151 through the ascending pipe 153. Additionally, the evaporator 134 heats the supply water with the inflammable gas which ascends inside the heat exchanger 102, and delivers the supply water to the steam drum 151 through the delivery pipe 156 in a steam-water mixed state.

Additionally, the steam drum 151 performs steam-water separation, and delivers steam to the superheaters 132 and 133 with the steam pipe 159, and superheats the steam in the superheaters. The superheaters 132 and 133 superheats the steam with the inflammable gas which ascends inside the heat exchanger 102, and delivers the produced superheated steam from the steam discharge line 160 to the steam turbine.

Additionally, in the space section 104 between the gasification furnace 101 and the pressure vessel 103, the gas nozzle 120 supplies the seal gas to the space section 104, and this seal gas ascends in the space section 104. In this case, since the pressure equalizing device 171 is provided between the gasification furnace 101 and the space section 104, the differential pressure between the gasification furnace 101 and the space section 104 is suppressed by the pressure equalizing device 171 even if the pressure of the gasification furnace 101 fluctuates.

Namely, in the coal gasification apparatus 14, the pressure inside the pressure vessel 103 (space section 104) becomes greater than the pressure inside the gasification furnace 101 at the time of normal operation. However, the pressure of the fuel gas which ascends inside the gasification furnace 101 may become greater than the pressure inside the pressure vessel 103 (space section 104) due to pressure fluctuation or the like. In this case, the differential pressure between the gasification furnace 101 and the space section 104 is suppressed as a portion of the fuel gas inside the gasification furnace 101 flows out to the interior of the pressure vessel 103 (space section 104) through each pressure equalizer 173.

Additionally, since the fuel gas inside the gasification furnace 101 includes the char, as illustrated by solid-line arrow A in FIG. 5, the char flows out to the interior of the pressure vessel 103 (space section 104) through each pressure equalizer 173 together with the fuel gas inside the gasification furnace 101. Since the char-receiving section 172 is positioned at the lower section of each pressure equalizer 173, the char which has flowed into the space section 104 through each pressure equalizer 173 together with the fuel gas is caught by and deposited on the char-receiving section 172. As a result, the char is prevented from falling to the lower side of the space section 104. In addition, in the space section 104, the gasification furnace 101 side (inner peripheral side) has a higher temperature than the pressure vessel 103 side (outer peripheral side). Therefore, the seal gas can ascend along the inner peripheral side of the space section 104 and ascend through the gas flow channel 174 located nearer to the inner peripheral side than the pressure equalizing device 171.

Also, if the coal gasification apparatus 14 returns to the normal operation, the pressure inside the pressure vessel 103 (space section 104) becomes greater than the pressure inside the gasification furnace 101. Then, as illustrated by dotted-line arrow B in FIG. 5, the char deposited on the char-receiving section 172 is sucked by the pressure equalizers 173 and is returned to the gasification furnace 101. In this case, while the lower ends of the pressure equalizers 173 have a wide angle, the inclination sections 183 and 184 are provided around the char-receiving section 172. Therefore, the char deposited on the char-receiving section 172 is gathered at the opening portions of the pressure equalizers 173 and is appropriately sucked.

In this way, the gasification apparatus of Example 1 is provided with the pressure vessel 103 which forms a hollow shape, and the gasification furnace 101 which forms a hollow shape and is positioned inside the pressure vessel 103 with the space section 104 therebetween, the heat exchanger 102 which is positioned at the upper section of the gasification furnace 101, and the gas nozzle 120 which supplies the seal gas to the lower section of the space section 104, the char-receiving section 172 which is provided above the heat exchanger 102 in the space section 104, the pressure equalizers 173 each of which one end communicates with the interior of the gasification furnace 101 and the other end opens into the char-receiving section 172, and the gas flow channel 174 which passes vertically through the side section of the char-receiving section 172.

Accordingly, even if pressure fluctuation occurs in the gasification furnace 101, the differential pressure between the interior of the gasification furnace 101 and the interior of the space section 104 can be reduced by the pressure equalizers 173, the char in the fuel gas discharged to the space section 104 due to a pressure increase inside the gasification furnace 101 can be appropriately caught by the char-receiving section 172, and falling of the char to the lower side of the space section 104 can be prevented. As a result, a differential pressure variation between the interior of the pressure vessel 104 and the interior of the gasification furnace 101 can be appropriately controlled, it becomes unnecessary to lengthen the pressure equalizers 173 and thus a structure can be simplified, and the soundness of the operation of the coal gasification apparatus 14 can be maintained.

In the gasification apparatus of Example 1, the pressure equalizers 173 are positioned in the space section 104, one end of each pressure equalizer opens to the furnace wall of the gasification furnace 101 extending in the vertical direction, and the other end thereof has a wide angle and opens to an upper surface of the bottom section 181 of the char-receiving section 172. Accordingly, as one end of each pressure equalizer 173 opens into the furnace wall of the gasification furnace 101 extending in the vertical direction, the pressure equalizer 173 communicates with a region which has almost no flow velocity fluctuation of the fuel gas which ascends through the gasification furnace 101. As a result, entering of the char into the pressure equalizer 173 can be suppressed. Additionally, as the other end of each pressure equalizer 173 has a wide angle and opens into the upper surface of the bottom section 181 of the char-receiving section 172, the char deposited on the char-receiving section 172 due to a pressure decrease inside the gasification furnace 101 can be appropriately sucked and returned to the gasification furnace 101.

In the gasification apparatus of Example 1, the char-receiving section 172 is formed in the recess shape and is positioned over the whole circumference (or a portion) of the space section 104, and the plurality of pressure equalizers 173 are provided at predetermined intervals in the circumferential direction of the space section 104. Accordingly, the differential pressure between the interior of the gasification furnace 101 and the interior of the space section 104 can be equalized by the pressure equalizers 173, and the char in the fuel gas discharged to the space section 104 due to a pressure increase inside the gasification furnace 101 can be reliably caught by the char-receiving section 172.

In the gasification apparatus of Example 1, the gas flow channel 174 is provided over the whole circumference (or a portion) of the space section 104. Accordingly, the whole region of the space section 104 between the pressure vessel 103 and the gasification furnace 101 can be appropriately filled with the seal gas.

In the gasification apparatus of Example 1, the gas flow channel 174 is provided in the vertical direction along the outer wall of the gasification furnace 101. Accordingly, since the gasification furnace 101 is in a higher temperature state than the pressure vessel 103, the seal gas ascends along the outer wall of the gasification furnace 101. As a result, as the gas flow channel 174 is provided along the outer wall of the gasification furnace 101, the whole region of the space section 104 can be appropriately filled with the gas without disturbing the flow of this gas.

In the gasification apparatus of Example 1, the gas flow channel 174 is provided between the outer wall of the gasification furnace 101 and the outer wall of the char-receiving section 172. Accordingly, as the gas flow channel 174 is constituted of the outer wall of the gasification furnace 101 and the outer wall of the char-receiving section 172, it becomes unnecessary to provide a separate member and the simplification of the configuration and cost reduction can be made possible.

In the gasification apparatus of Example 1, the char-receiving section 172 is provided below the pressure equalizers 173, and the bottom section 181 into which the other end of each pressure equalizer 173 opens and the inclination sections 183 and 184 which incline downward toward the bottom section 181 are provided. Accordingly, it becomes easy to bring the char deposited on the char-receiving section 172 together at the bottom section 181, and at the time of a pressure decrease inside the gasification furnace 101, the char deposited on the char-receiving section 172 can be efficiently sucked and returned to the gasification furnace 101.

Example 2

Figure 7:
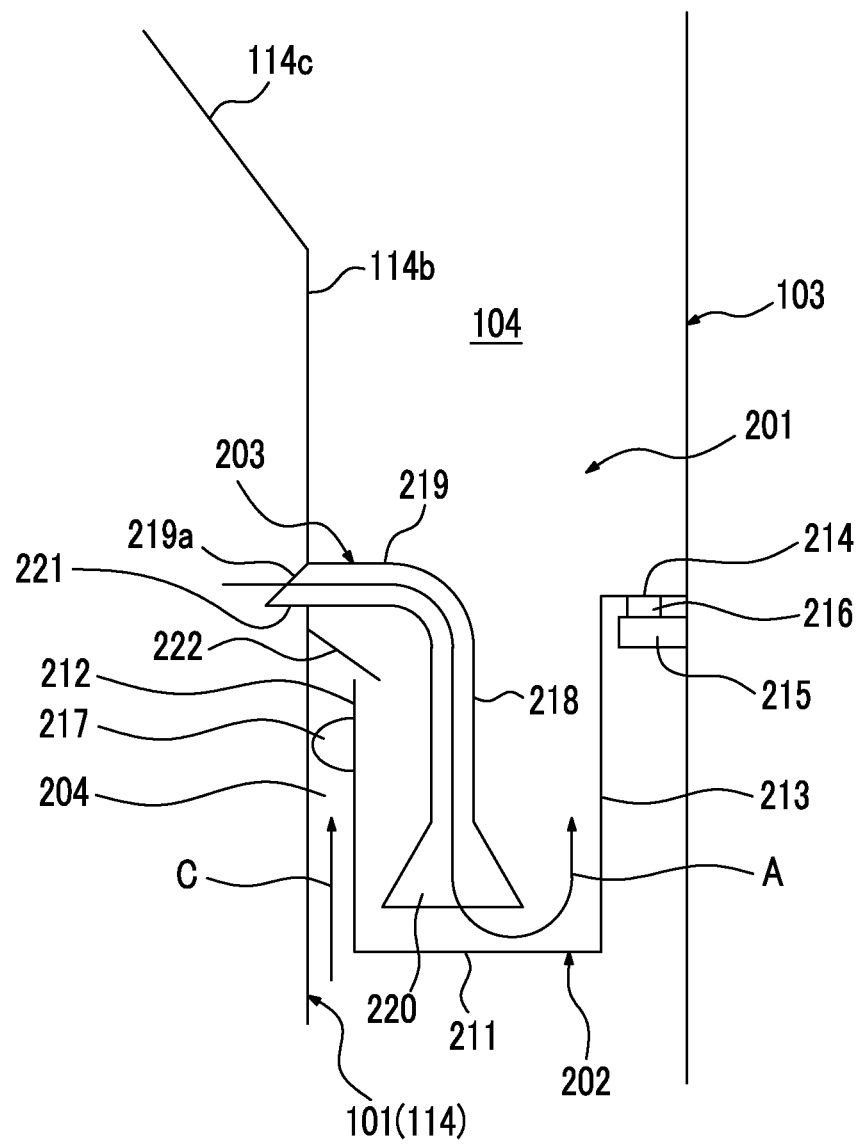
FIG. 7 is a schematic view illustrating a barometric device in the gasification apparatus related to Example 2 of the invention.
Figure 8:
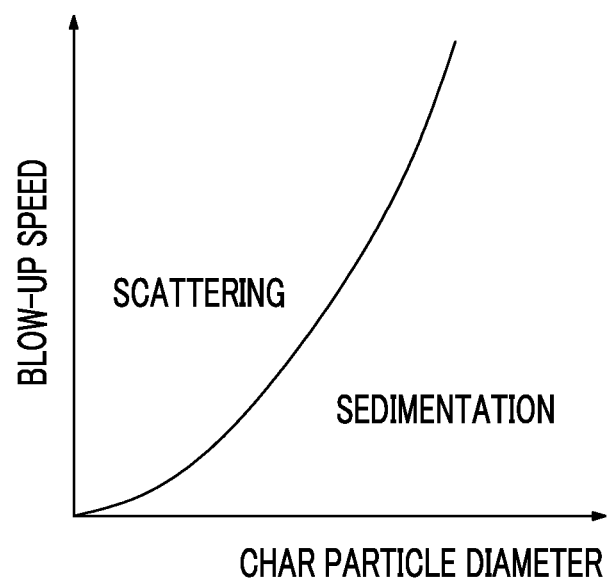
FIG. 8 is a graph illustrating the state of char according to a char particle diameter and a blow-up speed.

FIG. 7 shows a schematic view illustrating a barometric device in a gasification apparatus related to Example 2 of the invention, and FIG. 8 is a graph illustrating the state of char according to a char particle diameter and a blow-up speed. In addition, members having the same functions as those of the above-described embodiment will be designated by the same reference numerals, and the detailed description thereof will be omitted.

In the coal gasification apparatus of Example 2, as illustrated in FIG. 7, a pressure equalizing device 201 is provided at the upper section of the space section 104, that is, between the gasification furnace 101 (heat exchanger housing section 114) and the pressure vessel 103. The pressure equalizing device 201 has a char-receiving section 202 which is provided above the heat exchanger in the space section 104, a pressure equalizer 203 of which one end communicates with the interior of the gasification furnace 101 and the other end opens into the char-receiving section 202, and a gas flow channel 204 which passes vertically through a side section of the char-receiving section 202.

In the pressure equalizing device 201, the char-receiving section 202 forms a recess shape and is positioned over the whole circumference of the space section 104. A plurality of the pressure equalizers 203 are provided at predetermined intervals (equal intervals) in the circumferential direction in the space section 104.

Namely, the char-receiving section 202 is constituted of a horizontal bottom section 211 into which the other end of each pressure equalizer 203 opens, a first vertical wall section 212 which rises in the vertical direction from the end of the bottom section 211 on the gasification furnace 101 (heat exchanger housing section 114) side, a second vertical wall section 213 which rises in the vertical direction from the end of the bottom section 211 on the pressure vessel 103 side, and a supporting section 214 that extends in the horizontal direction from an upper end of the second vertical wall section 213. The pressure vessel 103 has a supporting member 215 fixed to an inner wall surface thereof. In the char-receiving section 202, the supporting section 214 is positioned on the supporting member 215 with a seal member 216 therebetween and is fixed by welding or the like.

Additionally, in the char-receiving section 202, a vibration preventing member 217 is provided on the gasification furnace 101 (heat exchanger housing section 114) side in the first vertical wall section 212. The vibration preventing member 217 can prevent the vibration of the char-receiving section 202 caused by the seal gas which ascends the gas flow channel 204. In addition, the vibration preventing member 217 is positioned at a predetermined position in the circumferential direction in the gas flow channel 204, and does not block the gas flow channel 204. In this case, welding or the like may be made unnecessary simply by providing the vibration preventing member 217, thereby placing the supporting section 214 of the char-receiving section 202 at the seal member 216 on the supporting member 215.

In addition, an inclination section may be provided on the supporting member 215 side, an inclination section may be provided also at the supporting section 214 of the char-receiving section 202, and an inclination section of the supporting section 214 of the char-receiving section 202 may be positioned on the inclination section of the supporting member 215 with the seal member 216 therebetween. In this case, the inclination sections can enhance the adhesion between the char-receiving section 202, the seal member 216, and the supporting member 215, and can improve sealing performance.

Each pressure equalizer 203 is positioned in the space section 104, and is constituted of a straight section 218 which extends in the vertical direction, a curved section 219 which is provided continuously with an upper end of the straight section 218 and is fixed in communication with the furnace wall 114a of the heat exchanger housing section 114 in the gasification furnace 101, and a wide angle section 220 which is provided continuously with a lower end of the straight section 218 and opens downward at a wide angle.

The gas flow channel 204 is provided over the whole circumference of the space section 104, and is provided between the outer wall of the gasification furnace 101 (heat exchanger housing section 114) and an outer wall of the char-receiving section 202, that is, the vertical wall section 212, and is provided in the vertical direction along the outer wall of the gasification furnace 101 (heat exchanger housing section 114).

Additionally, in the pressure equalizer 203, a second char entering preventing member is provided on the lower side of the end of the curved section 219 which communicates with the interior of the gasification furnace 101 (heat exchanger housing section 114). That is, as an opening end of the curved section 219 of the pressure equalizer 203 is formed with an inclination surface 219a, a protruding portion 221 which protrudes to the gasification furnace 101 (heat exchanger housing section 114) side is provided on a lower side of the inclination surface, and the protruding portion 221 functions as a second char entering preventing member. In this case, a separate plate may be fixed without extending the lower side of the opening end of the curved section 219 in the pressure equalizer 203 to provide the second char entering preventing member.

Additionally, a first char entering preventing member is provided on the upper side of the gas flow channel 204. Namely, the gas flow channel 204 is provided between the outer wall of the gasification furnace 101 (heat exchanger housing section 114) and the first vertical wall section 212 of the char-receiving section 202, and an eaves member 222 serving as the first char entering preventing member inclines to the upper side of the gas flow channel 204 and is fixed to the outer wall of the gasification furnace 101 (heat exchanger housing section 114). In this case, the eaves member 222 is positioned to incline downward toward the straight section 218 of the pressure equalizer 203 so as to cover the whole upper side of the gas flow channel 204 from the lower side of the curved section 219 of the pressure equalizer 203 in the outer wall of the gasification furnace 101 (heat exchanger housing section 114).

Meanwhile, as illustrated in FIG. 8, as for the particles of the char, the blow-up speed is set with respect to the particle diameter. In this drawing, the particles have a property of being blown up and scattered above a boundary and sedimenting below the boundary. That is, as for the particles of the char, particles having a particle diameter equal to or smaller than the trapping particle diameter of the pressure equalizing device 201 flow out from the gasification furnace 101 through the pressure equalizer 203 to the char-receiving section 202 at the time of the pressure increase of the gasification furnace 101. Then, the particles are accompanied with the seal gas C which ascends through the gas flow channel 204, are wound up, and then sediment on the char-receiving section 202 due to gravity. That is, the particles of the char cannot sediment in a flow having a flow velocity equal to or higher than the flow velocity of the accompanied seal gas. Therefore, the char which sediments downward from the gas flow channel 204 can be eliminated by enlarging the flow velocity V2 of the seal gas which ascends the gas flow channel 204 with respect the flow velocity V1 of a flow A which flows out and is blown up from the gasification furnace 101 through the pressure equalizer 203 to the char-receiving section 202 at the time of the pressure increase of the gasification furnace 101.

Here, the effects of the pressure equalizing device 201 of above-described Example 2 will be described.

At the time of the normal operation of the coal gasification apparatus, the pressure inside the pressure vessel 103 (space section 104) becomes greater than the pressure inside the gasification furnace 101. However, the pressure of the fuel gas which ascends inside the gasification furnace 101 may become greater than the pressure inside the pressure vessel 103 (space section 104) due to pressure fluctuation or the like. In this case, the differential pressure between the gasification furnace 101 and the space section 104 is suppressed as a portion of the fuel gas inside the gasification furnace 101 flows out to the interior of the pressure vessel 103 (space section 104) through each pressure equalizer 203.

Additionally, since the fuel gas inside the gasification furnace 101 includes the char, the char flows out to the interior of the pressure vessel 103 (space section 104) through each pressure equalizer 203 together with the fuel gas inside the gasification furnace 101. Since the char-receiving section 202 is positioned at the lower section of each pressure equalizer 203, the char which has flowed into the space section 104 through each pressure equalizer 203 together with the fuel gas is caught by and deposited on the char-receiving section 202. As a result, the char is prevented from falling to the lower side of the space section 104.

Also, if the coal gasification apparatus 14 returns to the normal operation, the pressure inside the pressure vessel 103 (space section 104) becomes greater than the pressure inside the gasification furnace 101. Then, the char deposited on the char-receiving section 202 is sucked by the pressure equalizers 203 and is returned to the gasification furnace 101. In this case, while the lower ends of the pressure equalizers 203 have a wide angle, the inclination sections 183 and 184 are provided around the char-receiving section 202. Therefore, the char deposited on the char-receiving section 202 is gathered at the opening portions of the pressure equalizers 203 and is appropriately sucked.

In this way, in the gasification apparatus of Example 2, the char-receiving section 202 is positioned on the supporting member 215 fixed to the inner wall of the pressure vessel 103 with the seal member 201 therebetween. Accordingly, the char-receiving section 202 can be easily positioned at a proper position, the mounting performance of the char-receiving section 202 can be improved, and the flow of the seal gas can be blocked by the seal member 216 to prevent diffusion of the char deposited on the char-receiving section 202.

In the gasification apparatus of Example 2, the eaves member 222 as the first char entering preventing member is provided on the upper side of the gas flow channel 204. Accordingly, when the flow rate of the seal gas which ascends the gas flow channel 204 decreases, the eaves member 222 can prevent entering of the char into the gas flow channel 204 and can prevent diffusion of the char to the space section 104.

In the gasification apparatus of Example 2, the protruding portion 221 as the second char entering preventing member is provided on the lower side of a communication section of each pressure equalizer 203 into the gasification furnace 101. Accordingly, when the char in fuel ascends inside the gasification furnace 101, the protruding portion 221 can prevent entering of the char into the pressure equalizer 203 and can prevent diffusion of the char to the space section 104.

In addition, in the above-described Example, the char-receiving section 172 or 202 is positioned over the whole circumference of the space section 104 in the pressure equalizing device 171 or 201 and is divided into four pieces in conformity with the quadrangular cross-sectional shape of the heat exchanger housing section 114 in the gasification furnace 101. However, the invention is not limited to this configuration. For example, the char-receiving section may be provided at every furnace wall 114a of the heat exchanger housing section 114 in the gasification furnace 101.

Additionally, although coal is used as fuel in the above-described Example, the invention can also be applied to high grade coal or low grade coal. Additionally, the fuel may be a biomass used as renewable organic resources originating from living things without being limited to coal. For example, it is also possible to use thinned wood, waste wood, driftwood, grass, waste, sludge, tires, and recycling fuel (pellets or chips) having these materials as raw materials.

REFERENCE SIGNS LIST

11: COAL SUPPLY APPARATUS
13: COAL MILL
14: COAL GASIFICATION APPARATUS
15: CHAR COLLECTION APPARATUS
16: GAS PURIFYING APPARATUS
17: GAS TURBINE FACILITY
18: STEAM TURBINE FACILITY
19: GENERATOR
20: HEAT RECOVERY STEAM GENERATOR
101: GASIFICATION FURNACE
102: HEAT EXCHANGER
103: PRESSURE VESSEL
104: SPACE SECTION
120: GAS NOZZLE (GAS SUPPLY UNIT)
171, 201: PRESSURE EQUALIZING DEVICE
172, 202: CHAR-RECEIVING SECTION
173, 203: PRESSURE EQUALIZER
174, 204: GAS FLOW CHANNEL

The invention claimed is:

1. A gasification apparatus which combusts and gasifies fuel to produce gas fuel, the gasification apparatus comprising:
  a pressure vessel which forms a hollow shape;
  a gasification furnace which forms a hollow shape and which is positioned inside the pressure vessel with a space section therebetween;
  a heat exchanger which is positioned at an upper section of the gasification furnace;
  a gas supply unit which supplies corrosion-resistant gas to a lower section of the space section;
  a char-receiving section which is provided above the heat exchanger in the space section;
  a pressure equalizer of which one end communicates with the gasification furnace and the other end opens into the char-receiving section; and
  a gas flow channel which passes vertically through a side section of the char-receiving section.

2. The gasification apparatus according to claim 1, wherein the pressure equalizer is positioned at the space section, one end of the pressure equalizer opens into a furnace wall extending in the vertical direction in the gasification furnace, and the other end of the pressure equalizer has a wide angle and opens into a bottom surface of the char-receiving section.

3. The gasification apparatus according to claim 1, wherein the char-receiving section forms a recess shape and is positioned over the whole circumference or a portion of the space section, and a plurality of the pressure equalizers are provided at predetermined intervals in a circumferential direction of the space section.

4. The gasification apparatus according to claim 1, wherein the gas flow channel is provided over the whole circumference or a portion of the space section.

5. The gasification apparatus according to claim 1, wherein the gas flow channel is provided in a vertical direction along an outer wall of the gasification furnace.

6. The gasification apparatus according to claim 1, wherein the gas flow channel is provided between an outer wall of the gasification furnace and an outer wall of the char-receiving section.

7. The gasification apparatus according to claim 1, wherein the char-receiving section has a bottom section which is provided below the pressure equalizer and into which the other end of the pressure equalizer opens, and an inclination section which inclines downward toward the bottom section.

8. The gasification apparatus according to claim 1,
wherein the char-receiving section is positioned on a supporting member fixed to an inner wall of the pressure vessel with a seal member therebetween.

9. The gasification apparatus according to claim 8,
wherein a first char entering preventing member is provided on an upper side of the gas flow channel.

10. The gasification apparatus according to claim 1,
wherein the pressure equalizer provides a second char entering preventing member on a lower side of a communication section into the gasification furnace.

* * * * *